Sept. 6, 1938.　　　J. J. JOHNSON　　　2,129,326
PHOTOGRAPHIC APPARATUS
Filed June 26, 1937　　2 Sheets-Sheet 1
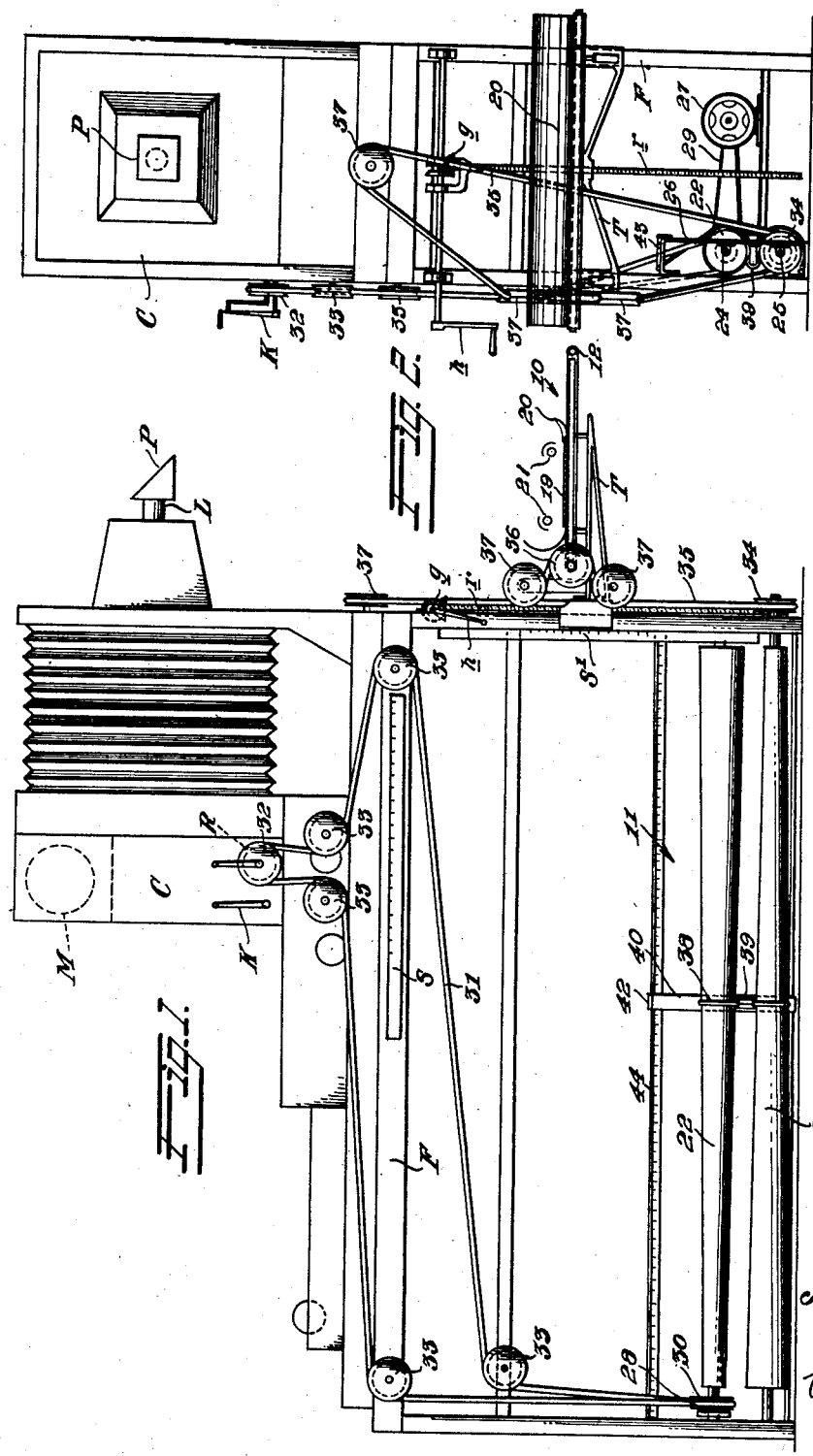
Inventor
John J. Johnson
Attorney Sept. 6, 1938.  J. J. JOHNSON  2,129,326
PHOTOGRAPHIC APPARATUS
Filed June 26, 1937  2 Sheets-Sheet 2
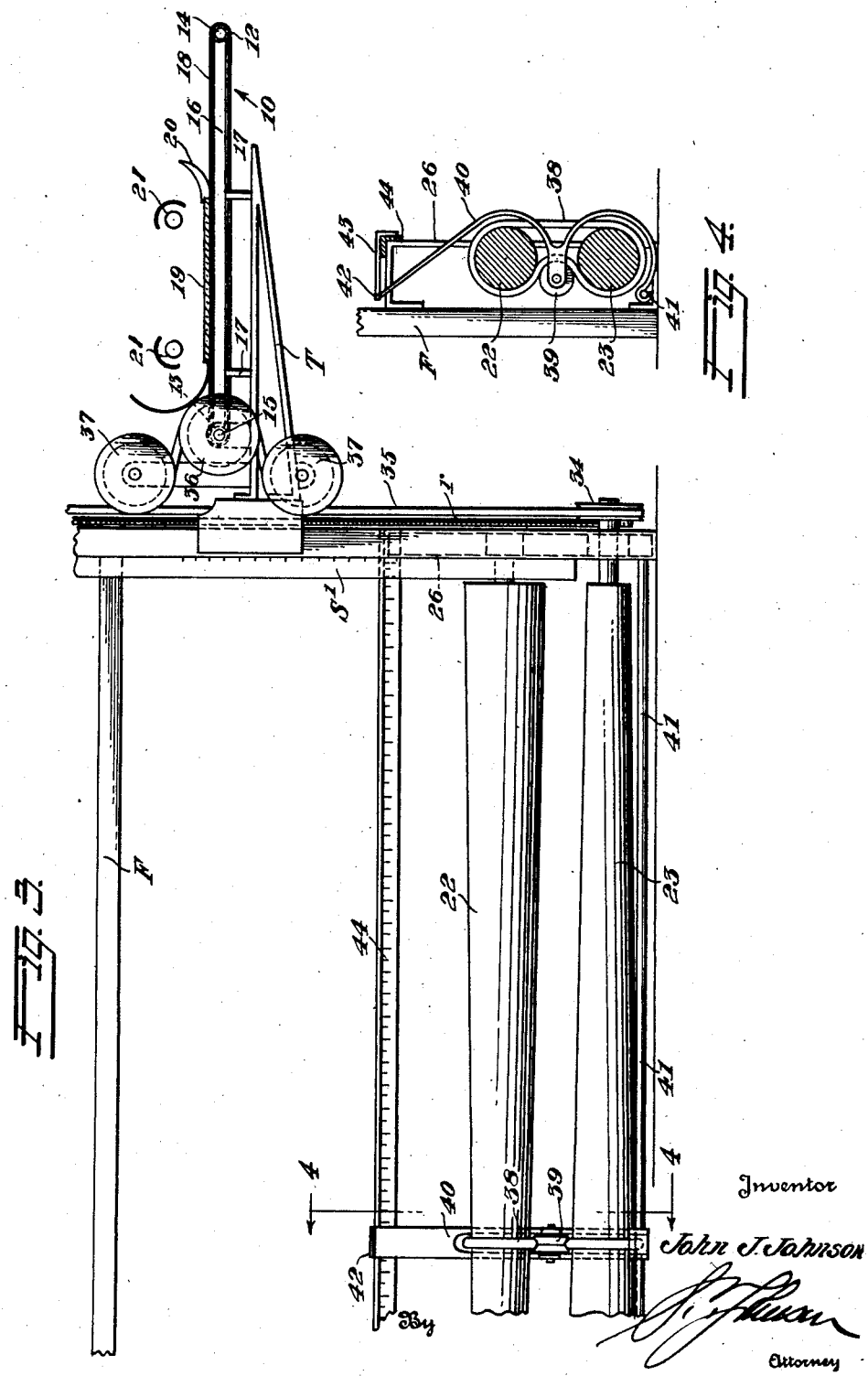

Patented Sept. 6, 1938

2,129,326

UNITED STATES PATENT OFFICE 2,129,326

PHOTOGRAPHIC APPARATUS

John J. Johnson, Dallas, Tex.

Application June 26, 1937, Serial No. 150,615

2 Claims. (Cl. 88—24)

This invention relates to photographic apparatus.

More specifically, the invention relates to an attachment for photographic cameras for a continuous reproduction of lengthy copies of records of a character such as Schlumberger electrical logs, seismograph records, driller logs, etc., the attachment embodying means whereby the reproduction may be enlarged, reduced, or of the same size as the original.

It is necessary with apparatus now in use to reproduce lengthy copies in relatively short sections, the length of which are determined by the focal range of the camera which is usually twenty-four inches.

While by this procedure a complete reproduction may be obtained, it does not meet the maximum requirements from the standpoint of time, economy in material and quality of the completed reproduction for the reason that it is necessary to paste the short sections together which is not only time consuming, but material is wasted in overlapping of the section and through inadvertence the sections are sometimes placed out of order, thus resulting in a highly objectionable reproduction.

A primary object of this invention is the provision of an attachment for photographic cameras whereby the above noted objections to the apparatus heretofore used are substantially overcome.

A further object of the invention is the provision of an attachment for photographic cameras whereby lengthy copies of records or characters can be reproduced continuously and in a single unitary strip.

A still further object of the invention is the provision of an attachment for a camera which is relatively simple in construction, accurate in operation, and which can be manufactured at a relatively low cost.

With the above objects in view as well as others that will become obvious in the course of the following disclosure, reference will be made to the accompanying drawings, in which:

Figure 1 is a side elevation of the device in operative association with a photographic camera.

Figure 2 is a right hand end elevation of the same.

Figure 3 is a fragmentary side elevation of the attachment on an enlarged scale.

Figure 4 is a sectional view on line 4—4 of Figure 3.

Referring to the drawings, C designates a photographic camera of any well known construction for the reproduction of characters, records, etc. The camera C is in accordance with well known practice adjustably supported on a frame F, the adjustment being determined by a scale S. Supported by the frame F is a table T which is vertically adjustable by means of threaded rod $r$, gears $g$ and handle $h$, the vertical adjustment being relative to lens L and prism P of the camera C for determining the relative size of the reproduction and original copy. The vertical adjustment of the table T is determined by the scale $S^1$.

The camera C further includes the paper roll magazine M, the paper winding roll R and the severing knife K.

The attachment forming the subject of the present invention embodies a copy strip propelling means 10 supported by the table T vertically below the prism P and a variable drive 11 between the propelling means 10 and the paper winding roll R, whereby the speed of movement of the strip may be varied in accordance with the focal adjustment of the camera determined by the scale $S^1$.

The strip propelling means 10 comprises a pair of horizontally spaced rollers 12 and 13 rotatably supported by pintles 14 and 15, respectively, which are carried at the opposite ends of a plate 16 supported above the table T by legs 17. The rollers 12 and 13 are embraced by a conveyor belt 18, the upper stretch of which moves beneath a glass 19 at the forward edge of which is a guide 20 to facilitate feeding of the end of the copy strip between the belt 18 and glass 19. The copy strip beneath glass 19 is illuminated by means of mercury vapor tubes 21.

The drive 11 comprises a pair of frusto-conical rollers 22 and 23, the opposite ends of which are supported by frame F adjacent the bottom thereof. The rollers 22 and 23 while not necessarily, are preferably of such conicity that one end has a diameter double that of the opposite end and the rollers are disposed with their larger ends adjacent opposite ends of the frame, whereby the space between the rollers is of uniform width from end to end and the lines defining the upper edge of the roller 22 and the lower edge of the roller 23 in side elevation thereof are parallel. The rollers 22 and 23 preferably have their opposite ends journaled in bearings 24 and 25 which are rigidly supported by brackets 26 suitably secured to the frame F.

The roller 22 is constantly driven at uniform speed by means of a motor 27 provided with suitable reduction gearing, the motor imparting rotation to the pulley 28 on the shaft of the roller 22 by means of a belt 29. Secured to the shaft of the roller 22 adjacent pulley 28 is a pulley 30 which is operatively engaged by a belt 31 which operatively engages and drives a pulley 32 on the paper feed roll R, the pulleys 30 and 32 being of the same diameter, whereby the roller 22 and paper feed roll R rotate at the same speed.

Rotatably supported by the frame F are a plurality of idler pulleys 33 for properly directing the opposed reaches of the belt 31 between the pulleys 30 and 32.

Secured to the shaft of the roller 23 adjacent the smaller end thereof and opposite the end of the roller 22 to which the pulley 30 is secured is a pulley 34 which is operatively engaged by a belt 35 which engages and imparts rotation to the pulley 36 secured to the pintle 15 of the roller 13 for imparting movement to the conveyor belt 18. Rotatably supported by the frame F are a plurality of idler pulleys 37 for properly directing the opposed reaches of the belt 35. Rotation of the roller 22 is imparted to the roller 23 by means of a belt 38 which is maintained under tension or proper driving position by means of an idler roller 39 rotatably supported by a belt shifting member 40, the lower end of which pivotally and slidably engages a rod 41 and to the upper end of which is pivotally secured at 42 a retaining latch 43 which engages a scale bar 44.

With the construction as above described the paper winding roll R is on the camera C and the roller 22 is driven at equal speeds of rotation by means of the motor 27 and interconnecting belts and pulleys as above described while the roller 23 is subject to rotation at various speeds dependent upon the location of the belt 38 lengthwise of the rollers 22 and 23, whereby the conveyor belt 18 may be driven at different speeds dependent upon the focal adjustment of the camera C as determined by the scale S¹ for providing reproductions which are of the same size, smaller, or larger than the original which is moved past the focal range of the camera by means of the conveyor belt 18.

In operation of the construction described, the table T is vertically adjusted relative to the camera lens L for any desired scale of reproduction of the original, same, reduced or enlarged as is determined by the scale S¹.

When the reproduction is to be of the same size as the original, the sensitized paper strip in the camera C and the copy strip supported on the belt 18 should travel at the same rates of speed and for such equal rates of speed the belt 38 will be positioned in the center of the rollers 22 and 23 as is illustrated on the drawings, as at this point the rollers 22 and 23 are of equal diameter and the pulleys 30, 32, 34 and 36 are of equal diameter. The scale bar 44 is suitably graduated whereby the belt 38 may be shifted lengthwise of the rollers 22 and 23 to vary the speed of the belt 18 in accordance with the vertical adjustment of table T as determined by scale S¹ dependent upon the relative size of the reproduction desired.

When a reduced reproduction is desired the copy strip should travel faster than the sensitized camera strip and accordingly after proper vertical adjustment of the table T the belt 38 is shifted to the right to a position as indicated by the scale bar 44 for the particular reduction designated by the scale S¹. If the belt 38 is placed at the extreme right ends of the rollers 22 and 23 the copy strip will travel twice as fast as the sensitized camera strip and a reproduction of half the size of the original will result if the table T has been adjusted for such reduction. If the belt 38 is shifted to the left on rollers 22 and 23 the copy strip will travel slower than the sensitized camera strip for an enlarged reproduction at such size dependent upon the adjustment of the table T and the extent of movement of the belt 38 toward the left hand ends of the rollers 22 and 23. When the enlargement is to be twice the original size the belt 38 will be positioned at the extreme left ends of the rollers 22 and 23.

Thus it will be apparent that a photographic attachment is provided whereby lengthy copies may be continuously reproduced on a single length of photographic papers and that the size of the reproduction relative to the original may readily be varied.

While the rollers 22 and 23 as described are of such conicity that the copy may be enlarged to double size or reduced to one-half size, the conicity may be such as to provide for a greater range in size of the reproduction.

Due to the reversed arrangement of the rollers 22 and 23 the tension on the belt 38 will be uniform regardless of the position lengthwise of the rollers and the reaction of the tensioned belt on the roller 39 will bind latch 43 against bar 44 to preclude inadvertent shifting of the belt from any adjusted position thereof.

When the belt 38 is to be shifted, the latch 43 is raised above bar 44 about pivot 42 whereupon the tension of the belt 38 is relieved and the member 40 is then manually shifted along rod 41 to the desired position as determined by the scale bar 44 whereupon the latch 43 is moved downward into locking engagement with the bar 44.

It is to be noted that the pulley 36 and adjacent idler pulley 37 are supported by the table T and as these pulleys are disposed substantially at a vertex of the triangular formation of the belt 35 the tension of the belt will not be substantially altered upon vertical adjustment of the table T.

By use of the construction disclosed, lengthy copies of data, characters and records, etc., may be continuously reproduced with resulting saving in time and material as well as a high quality of reproduction.

What is claimed is:

1. In combination with a photographic apparatus comprising a supporting frame, a camera having a sensitized paper winding roll, and a copy supporting table adjustably mounted relative to the camera for providing different scale reproductions of the copy, an attachment comprising a conveyor mounted on the table for continuously moving a copy strip through the focal range of the camera, a first and second pulley rotatably supported adjacent the bottom of the frame, the paper winding roll and conveyor each provided with an actuating pulley, a drive belt interconnecting the first rotatably supported pulley and the paper winding roll pulley, power means imparting continuous rotation to the first pulley at uniform speed, a drive belt interconnecting the second rotatably supported pulley and the conveyor pulley, a variable drive connection between the first and second rotatably supported pulleys, said variable drive connection comprising a pair of frusto-conical rollers whose axes are parallel and having their respective smaller ends adjacent opposite ends of the frame, the first rotatably mounted pulley being secured to one of the rollers adjacent its smaller end, the second rotatably supported pulley being secured to the other roller adjacent its smaller end, and a drive belt operatively engaged with the rollers and adjustable axially thereof.

2. In combination with a photographic apparatus comprising a supporting frame, a camera having a sensitized paper winding roll, and a copy supporting table adjustably mounted relative to the camera for providing different scale reproductions of the copy, an attachment comprising a conveyor mounted on the table for continuously moving a copy strip through the focal range of the camera, a first and second pulley rotatably supported adjacent the bottom of the frame, the paper winding roll and conveyor each provided with an actuating pulley, a drive belt interconnecting the first rotatably supported pulley and the paper winding roll pulley, power means imparting continuous rotation to the first pulley at uniform speed, a drive belt interconnecting the second rotatably supported pulley and the conveyor pulley, a variable drive connection between the first and second rotatably supported pulleys, the second named drive belt engaging an idler pulley at each side of the conveyor pulley and adjacent thereto, and an idler pulley rotatably supported adjacent the top of the frame, the conveyor pulley and idler pulleys adjacent thereto being substantially at the vertex of a trough formed by the belt in surrounding all of the pulleys, whereby the tension in the belt will remain substantially constant upon adjustment of the table.

JOHN J. JOHNSON.